M. A. GARRETT.
VALVE MECHANISM FOR TANK CARS.
APPLICATION FILED APR. 21, 1920.

1,399,608.

Patented Dec. 6, 1921.
4 SHEETS—SHEET 1.

Inventor:
M. A. Garrett,
By J. E. Stebbins,
Attorney.

M. A. GARRETT.
VALVE MECHANISM FOR TANK CARS.
APPLICATION FILED APR. 21, 1920.

1,399,608.

Patented Dec. 6, 1921.
4 SHEETS—SHEET 2.

Inventor,
M. A. Garrett
By F. E. Stebbins,
Attorney.

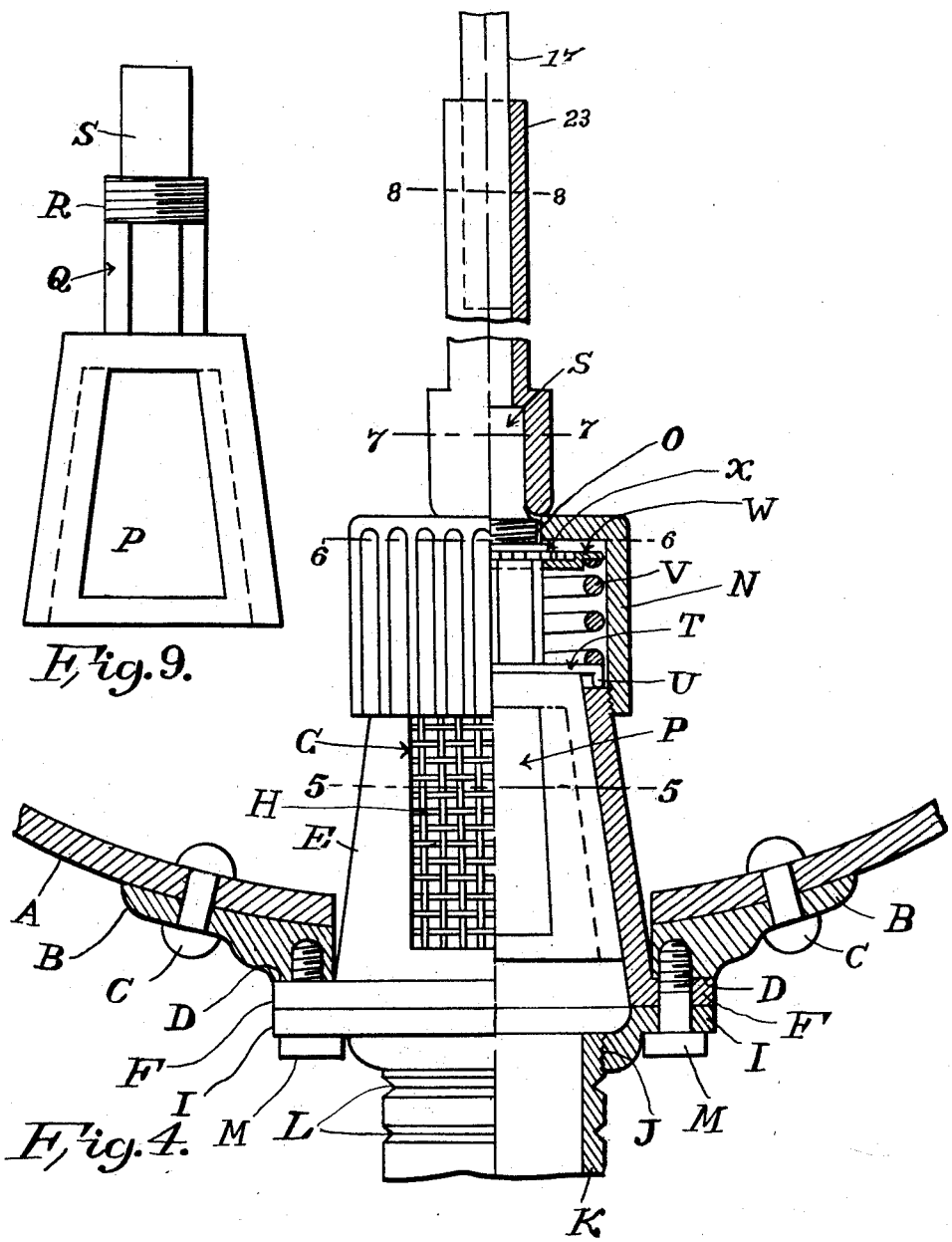

M. A. GARRETT.
VALVE MECHANISM FOR TANK CARS.
APPLICATION FILED APR. 21, 1920.

1,399,608.

Patented Dec. 6, 1921.
4 SHEETS—SHEET 4.

INVENTOR.
M. A. Garrett
BY F. E. Stebbins
ATTORNEY.

UNITED STATES PATENT OFFICE.

MYERS A. GARRETT, OF CHICAGO, ILLINOIS, ASSIGNOR TO CARLTON M. GARRETT, OF NEW YORK, N. Y.

VALVE MECHANISM FOR TANK-CARS.

1,399,608.  Specification of Letters Patent.  Patented Dec. 6, 1921.

Application filed April 21, 1920. Serial No. 375,642.

*To all whom it may concern:*

Be it known that I, MYERS A. GARRETT, a citizen of the United States, residing at Chicago, in the county of Cook and State of Illinois, have invented certain new and useful Improvements in Valve Mechanism for Tank-Cars; and I do hereby declare the following to be a full, clear, and exact description of the invention, such as will enable others skilled in the art to which it appertains to make and use the same.

Discharge valves heretofore designed and used in connection with tank cars have not prevented leakage of oil or other liquid from the tank. Some of the causes of leakage are: Breaking of the discharge pipe and unseating of the valve. Dirt and trash have lodged on the valve seat or between the valve and casing, preventing a tight fit. Cocking of the valve has taken place, due to insufficient guiding surfaces. The surging action of the liquid contents of the tank has displaced the valve. Change of shape of the tank, due to the weight of the load or to heat, has also displaced the valve.

The means designed for operating the valve have also been inefficient and unreliable. Furthermore, after the contents of the tank have been discharged the valve has not been closed, but left open. No means have been provided for loosening the valve when it stuck in the seat. Other imperfections appertain to such valves, known to those familiar with tank car operation and use.

The object of my invention is the provision of an improved valve mechanism in which the imperfections enumerated, and others, shall be obviated; which shall not leak; which can be easily operated; and which shall be so constructed that the dome cover cannot be replaced till the valve is closed.

A further object is the provision of a valve so combined with the tank that it will be mainly located within the tank interior where a wreck will not break or open it and which will be independent of the discharge pipe which can be broken off without displacing the valve.

A further object is the provision of a valve which can be inserted and withdrawn or removed at the bottom of the tank; and which in combination with the operating mechanism shall constitute superior means for performing the requisite functions of a perfect valve mechanism.

My invention consists in certain novelties of construction and combinations of parts as herein set forth and specified in the claims.

The accompanying drawings illustrate an example of the embodiment of the invention and the several improvements constructed and the parts combined according to the best modes of procedure I have so far devised for the purpose.

Fig. 4 is a view of the valve proper, part in vertical section and part in elevation.

Figure 8:
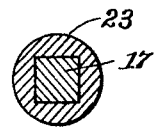
Figure 7:
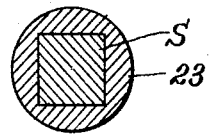
Figure 5:
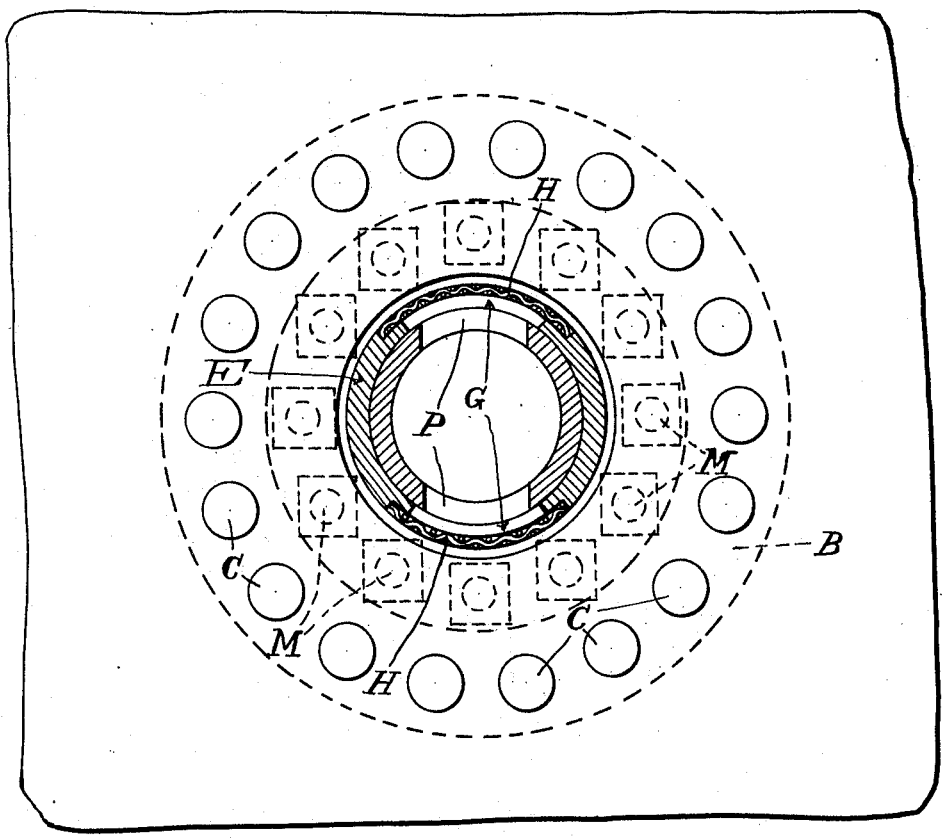
Fig. 5 is an enlarged horizontal section taken on line 5—5 of Fig. 4.
Figure 6:
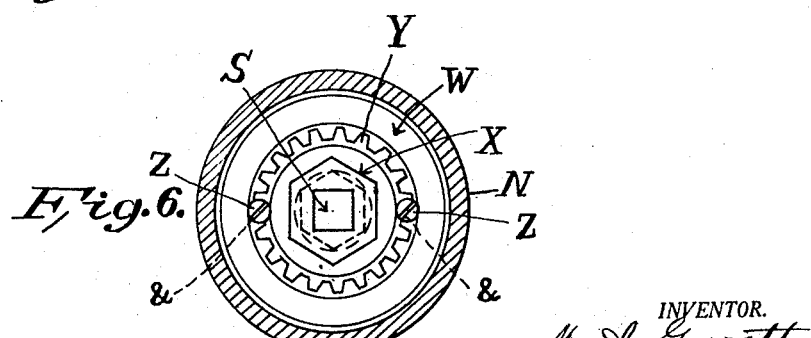
Fig. 6 is a horizontal section of Fig. 4 on line 6—6.

Figs. 7 and 8 are sections of Fig. 4 on line 7—7 and 8—8.

Fig. 9 is a view of the valve plug and shank in elevation.

The movable part of the valve and the movable operating mechanism are located entirely within the interior space of the tank. To operate the valve the cover of the dome must be removed to reach the operating lever. The valve can be inserted and removed at the bottom of the tank.

The letter A designates the body of the tank at the bottom of which is a circular opening or hole, as shown. A cast metal substantially circular strengthening rim B having a flange and threaded holes is secured to the outer surface at the edge of the opening by rivets C passed through the flange and metal of the tank shell, the lower circular edge D thereof being in the same plane.

The valve casing E is of the shape shown. It is hollow, tapered upwardly, is open at the ends, the upper edge threaded, the lower end provided with a perforated flange F, and has oppositely disposed openings G in its walls, which openings are each covered by a wire screen H secured in position in any suitable way. Below the flange F is a cover I having a perforated flange and threaded opening at J to which threads is secured a cast metal discharge pipe K with a score or scores L so the lower part of the pipe can break off, in an accident, for example, without injuring or distorting the parts above the same. The cover and casing are detachably secured to the rim D by threaded stud bolts M the ends of which are seated in the holes in the cast metal rim. Obviously, by unscrewing these bolts the valve mechanism may be removed for repairs and replaced. At the upper threaded end of the casing E is a hollow housing N having threads at its lower edge to engage the threads at the upper edge of the casing, as shown, and the end or top wall is provided with a hole O through which loosely passes the shank of the valve plug.

The valve plug consists of a hollow shell open at the lower end shaped exteriorly to closely fit the interior surface of the casing, and has two oppositely disposed openings P adapted when the plug is rotated to register with the openings G in the casing and when turned one-fourth the way around to close said openings. From the top closed end of the plug extends a shank, the part Q hexagonal in cross section, the part R threaded, and the top end S square in cross section. Passed over the part Q is a disk T having a hexagonal central opening so it cannot turn and a flange U rounded at the edge and frictionally bearing upon the upper edge of the casing so it can turn easily with the plug. Above this disk is a coiled spring V, and above the spring a disk W having a hexagonal hole so the disk cannot turn. Upon the threaded part R of the shank is a threaded hexagonal nut X provided with a notched edge Y seated in a countersunk recess in the disk W. When the nut is screwed down it compresses the spring and draws the plug upwardly into close frictional contact with the inner surface of the casing so there can be no leakage of the contents of the tank. Obviously, as the two disks fit the part Q of the shank they rotate with it and to prevent the rotation of the nut X one or more screws Z is or are passed through a notch or notches in the edge of the nut and seated within a threaded hole or holes and in the disk W.

Figure 2:
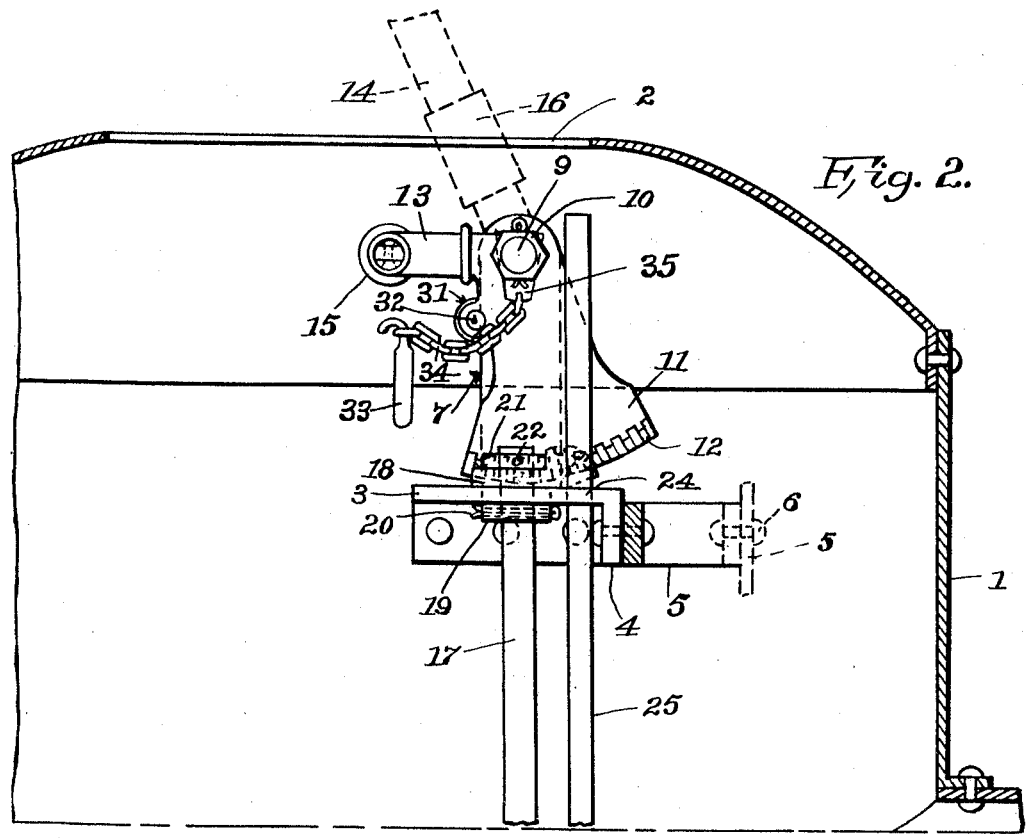
Fig. 2 is a view in vertical section of part of the dome of a tank car, part of the valve operating mechanism being in elevation.
Figure 1:
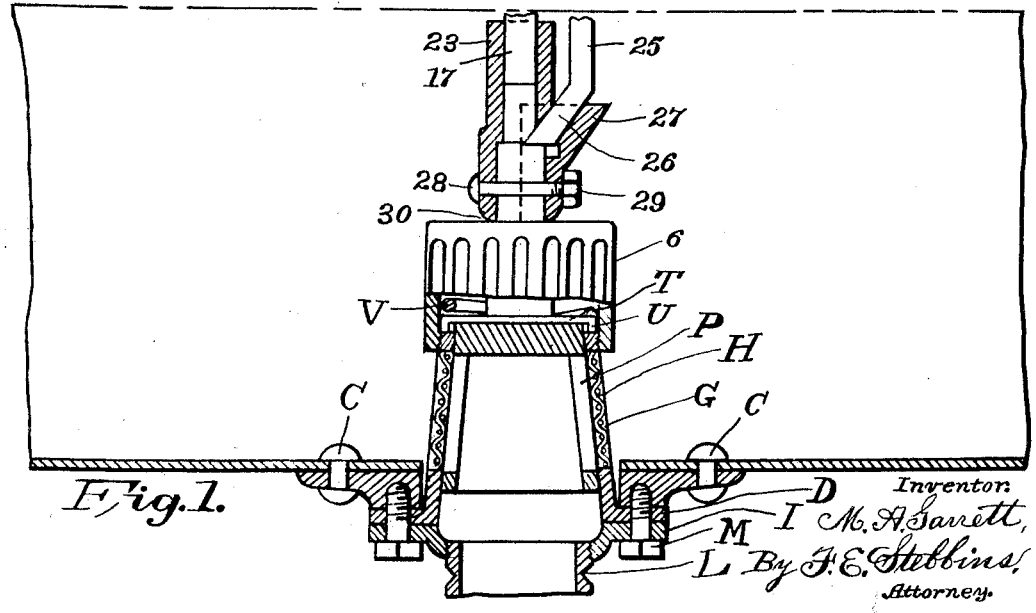
Figure 1 is a view in vertical section of part of the lower portion of a tank car, showing part of the valve mechanism in section.
Figure 3:
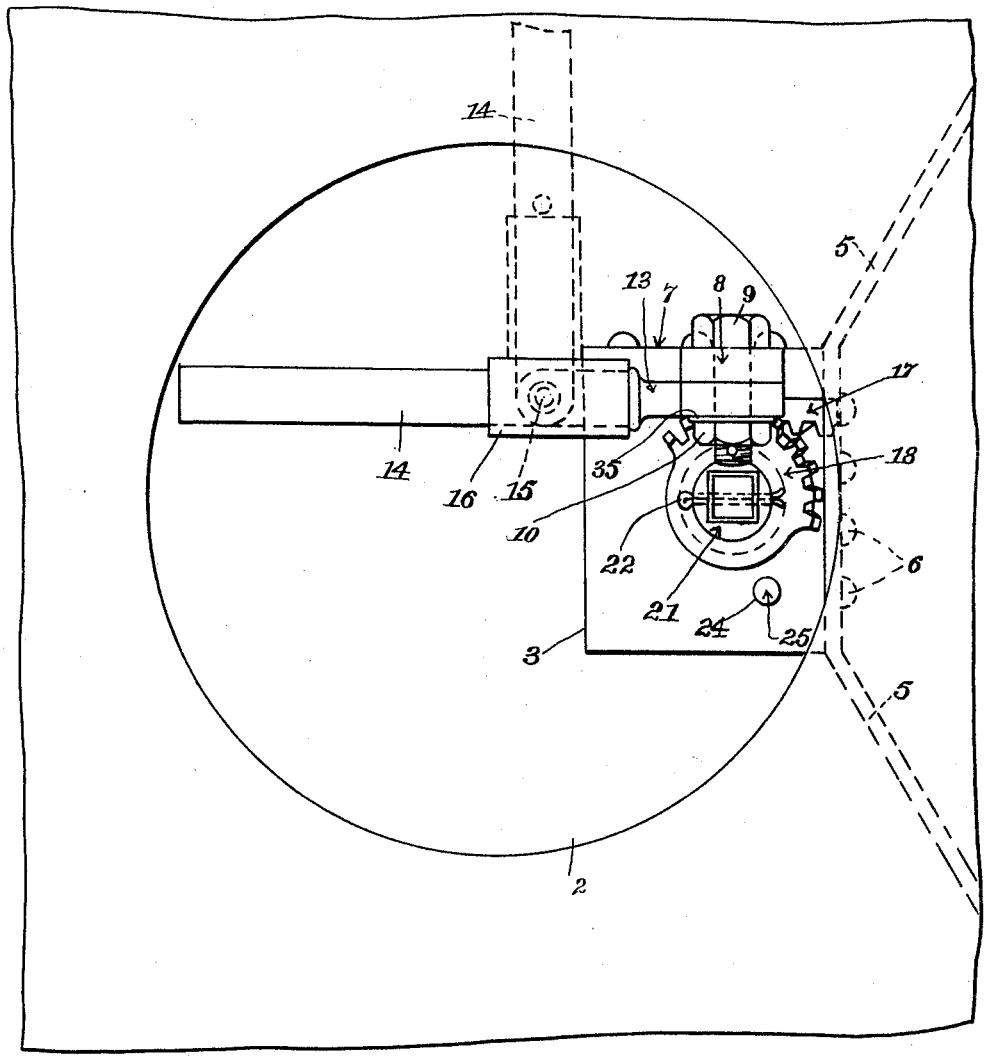
Fig. 3 is a top plan view of the dome with the cover removed, showing the location of the valve operating mechanism.

The mechanism for rotating the valve plug is as follows: The tank has a dome 1 of well known construction, the edge of the circular opening to which is designated by 2. A removable cover for the dome, of well known construction, is not shown. Close to and below the circular opening in the dome is a bracket having a horizontally disposed plate portion 3 and a flange 4 to which flange is riveted a stay having two arms 5, 5 which extend in a horizontal plane to the inner surface of the dome, to which they are fastened, for example, at 6 by rivets. The bracket is thus held in a fixed position relative to the dome and the opening thereto. Secured to the edge of the plate portion 3 or made integral therewith is a standard 7 having a hole 8 at the upper end. To this upper end of the standard is journaled, through the medium of a bolt and nut 9 and 10, the upper end of a beveled gear segment 11 having teeth 12, as shown. This segment is provided with a rigid lateral extension 13, to which a lever arm 14 is jointed by a bolt 15. On the lever arm is a slidable sleeve 16. When the lever arm is in line with the extension 13 the sleeve can be slid over the joint. An upward movement of the lever arm rocks the segment and opens the valve, as will be understood later, and the lever projects outside the opening to the dome. In order to replace the cover on the dome, the lever arm must be turned down inside the dome, and such action closes the valve. When turned down, the sleeve may be slid from the joint and the lever arm turned sidewise, as shown by dotted lines in Fig. 3.

The plate portion 3 has a circular opening therethrough within which opening is the upper end of an operating rod or bar 17 square or angular in cross section. On the end of the rod is a toothed segment 18, the teeth engaging the teeth on the beveled gear segment 11, as shown. This segment 18 has a bearing boss 19 secured to the rod by a rivet or cotter 20 passed through the boss and rod. A washer 21 is located above the segment 18 on the rod end and secured by a rivet 22 or a cotter pin. The segment and rod obviously rotate together. The lower end of the operating rod 17 loosely fits within a sleeve 23 having a square hole and the rod can move up and down therein so that should the rod become bent by the surging of the contents of the tank or otherwise there will be no interference with its free rotation, nor will its change in length in any way affect the valve plug.

Extending upwardly and loosely seated within a hole 24 in the plate portion of the bracket is a rod 25 having at its lower end an upset portion 26 located within an opening in the sleeve 23, said end being in contact with the upper end of the valve plug shank. It is held in place by a sleeve 27, and the sleeve 27 and sleeve 23 are secured to the square end of the valve plug shank by a through bolt 28 and nut 29. In case the valve plug should stick in its seat blows on the end of the rod 25 with a hammer will loosen it.

To prevent any play of the valve plug vertically relative to the casing which might occur incident to the vibratory movements of the tank body upon the trucks or passing over rail joints the lower end of sleeve 23 at the edge 30 is rounded to minimize friction in turning and to form a close contact with the upper surface of the housing at the end of the valve casing. The space within the housing may be filled with a packing of cotton waste or other fibrous material so that should there be any seeping of the contents of the tank, which often contains sand or dirt, the same would not pass to the bearing surfaces of the plug and casing and cause leakage.

The operation of the valve will be readily understood by those skilled in the art from the description and an inspection of the drawings.

In the practical construction and application of the valve and mechanism numerous minor modifications may be introduced without constituting substantial departures.

I have shown in connection with the standard 7 and beveled gear segment 11 means for locking them together when the valve is closed, said means consisting of a hole 31 in the edge of the standard, a hole 32 in the edge of the segment, and a pin 33 to be inserted through both holes which are in line only when the valve is closed. A chain 34 secures the pin to a perforated metallic disk 35 located between the nut and segment and through which disk the bolt 9 passes.

From the description and drawings it will be clear to those skilled in the art that I have provided a valve and operating mechanism which fulfils all the conditions set forth as the object of the invention.

What I claim is:

1. The combination with a tank having an opening at the bottom, of a hollow valve casing open at the ends, tapering inwardly and upwardly, and provided with a discharge opening between its ends; a hollow plug matching the interior surface of the casing, having an opening between its ends adapted to register with the opening in the casing, open at the bottom and closed at the top end and provided with a shank; a hollow housing having means for securing its lower edge to the casing so as to entirely inclose the upper part of said casing, and a hole through the top end wall through which the shank of the plug loosely passes; and means for securing the valve casing within the said tank opening.

2. The subject-matter of claim 1 when the valve casing is provided with a perforated flange at its lower end and is detachably secured within the said tank opening by threaded bolts.

3. The subject-matter of claim 1 with the addition of a spring within the housing forcing the valve plug upwardly in frictional contact with the inner surface of the casing.

4. The subject-matter of claim 1 with the addition of a spring within the housing located between two disks which engage the shank of the valve plug so they rotate with the plug.

5. The subject-matter of claim 1 with the addition of a spring, two disks, and a threaded nut within the housing, said nut engaging a threaded part of the shank; and means for locking the nut so it will rotate with the valve plug.

6. The subject-matter of claim 1 with the addition of a sleeve secured to the top end of the valve plug shank and its lower edge in frictional contact with the top surface of the housing adjacent the opening therethrough.

7. The subject-matter of claim 1 with the addition of a spring, a disk, and a threaded nut engaging a threaded part of the shank within the housing, and means for locking the nut to the disk and the disk to the shank so the nut and disk will rotate with the shank.

8. The subject-matter of claim 1 when the valve casing is provided with two oppositely disposed openings between its ends and the valve plug has two oppositely disposed openings adapted to register with the said openings in the casing.

9. The subject-matter of claim 1 when the opening through the bottom of the tank has a flanged casting or rim secured around said opening and the valve casing is detachably secured to said casting.

10. The subject-matter of claim 1 when the top end of the valve plug shank is angular in cross section and a sleeve with a hole angular in cross section is located upon said shank end and secured in position.

11. The combination with a tank having an opening at the top, of valve operating mechanism comprising a bracket within the tank, means for securing said bracket to the tank, an operating rod supported by the bracket and loosely connected with a valve at the lower part of the tank so said rod can move upwardly and downwardly and be bent or its length changed without imparting motion to the valve, and lever mechanism supported by the bracket and adapted to rotate said rod and the valve.

12. The combination with a tank having an opening at the top and an opening at the bottom, of a valve casing and valve at the bottom opening, said valve normally having rotary motion only relative to the casing; and mechanism for operating the said valve comprising a bracket within the tank, means for securing the bracket to the tank, an operating rod or bar carrying a toothed gear supported by the bracket and in operative connection with the valve, a second toothed gear pivotally supported by the bracket and engaging the toothed gear on the rod or bar, and means for operating the last mentioned toothed gear; the connection between the valve and the parts supported by the bracket being loose so the changes in shape of the tank incident to use will not interfere with the valve and casing.

13. The subject-matter of claim 12 when the bracket has a standard to which one of said toothed gears is journaled and said toothed gear has a lever by which the same is rotated.

14. The subject-matter of claim 12 when one of said toothed gears is provided with a lever which when said valve is in open position projects through the opening at the top of the tank and when the valve is closed lies below the said opening.

15. The subject-matter of claim 12, when one of the toothed gears is mounted on the rod and has a bearing in the bracket, and the other toothed gear is pivoted to a standard and has associated therewith a lever the end of which lever when the valve is turned to an open position projects outside the opening at the top of the tank and when the valve is closed is located within the tank.

16. The combination with a valve having a valve plug with a shank, of a sleeve secured to said shank and having an opening angular in cross section, an operating rod angular in cross section having its end loosely seated within the angular opening of the sleeve, a bracket supporting the upper end of said rod, and means for rotating the rod, sleeve and valve plug.

17. The combination with a tank car having a tapering casing of less diameter at the top than at the bottom and vertically disposed relative to an opening at the bottom of the tank, and a rotary valve plug fitting said casing, of means for operating said valve plug, and means extending to the tank dome opening for loosening said plug when it sticks in its seat.

18. The subject-matter of claim 17 when said means consists of a rod or bar at one end engaging the valve plug and at its other end suitably supported within the tank.

19. A tank having an opening at the bottom, an upwardly tapering frusto-conical valve casing and valve plug both secured in said opening and projecting upwardly into the interior of the tank, a housing secured to the casing, a discharge pipe below the plug, and means engaging the housing for preventing vertical movements of said valve plug relative to the valve casing; said casing having a discharge opening to the interior of the valve plug, and said valve plug having a discharge opening through its lower end to the discharge pipe.

20. The combination with a tank having a discharge opening, of a ring secured about the said opening, a valve mechanism located mainly within the tank and having a flange matching the ring, a bottom cover, and a discharge pipe provided with a score in connection with the cover; said valve mechanism flange and cover being secured to said ring.

21. The combination with a tank having an opening at the top and a discharge opening, of valve mechanism, and means for operating said valve mechanism comprising a lever located adjacent the opening at the top of the tank, a rod connected with the valve mechanism and toothed gearing between the lever and rod for rotating the rod; the parts being so associated and combined that when the valve is in an open position the end of the lever will project outside the said opening at the top and when the valve is in a closed position the end of the lever will be located within the tank.

22. The combination with a tank having a discharge opening, of a ring secured about the opening, a casing, a plug valve open at the bottom, a bottom cover, and a separate outlet pipe in connection with the cover; the said casing and bottom cover being secured to the ring.

23. The combination with a tank having an opening at the bottom, of a valve mechanism comprising a casing with a flange at the bottom, said flange being located outside the tank wall, a valve seat inside the casing, a valve inside the casing, and a bottom cover with a flange and an opening, said cover flange fitting the flange of the said casing, and bolts uniting the casing and cover to the tank wall.

24. The combination with a tank car having an opening at the bottom provided with a ring secured to the tank wall about the opening, of a valve casing having a flange at the bottom and a frusto-conical valve seat with an opening, and a frusto-conical valve with an opening fitting the seat, said casing flange matching and secured to said ring, and said casing and valve being located mainly within the interior of the tank wall.

25. The subject-matter of claim 24 when the openings in the casing and valve are located adjacent the opening at the bottom of the tank whereby the entire contents of the tank can be discharged by gravity.

26. The subject-matter of claim 24 with the addition of means in connection with the valve and extended to the top of the car for operating the said valve.

27. The combination with a metallic tank having an opening at the bottom, of a ring secured to the metal of the tank about the opening, a valve mechanism having a casing with a flange at the bottom matching the ring outside the tank wall, a valve in connection with the casing, a bottom cover having an opening and a flange matching the flange of the casing, and means for detachably securing the flange of the casing and the flange of the cover to the said ring.

28. The combination with a tank car having an opening at the bottom, of a ring secured to the tank wall about the opening, and a valve mechanism with a discharge opening located mainly within the tank and having a flange matching and secured to said ring, whereby the valve mechanism can be inserted and removed at the said opening.

29. The subject-matter of claim 28 when the discharge opening through the valve mechanism is located adjacent the opening at the bottom of the tank so the entire contents of the tank can be discharged by gravity.

30. The subject-matter of claim 28 with the addition of means connected with the valve mechanism and extended to the top of the car for operating the valve.

31. The combination with a metallic tank having an opening at the bottom, of a ring riveted in position about the opening, a valve mechanism with a discharge opening located mainly within the tank and having a flange matching the ring, and a bottom cover, said valve mechanism flange and cover being detachably secured to the said ring.

32. The subject-matter of claim 31 when the discharge opening in the valve mechanism is located adjacent the opening at the bottom of the tank so the entire contents of the tank can be discharged by gravity.

33. The subject-matter of claim 31 with the addition of means connected with the valve and extended to the top of the car for operating the valve.

34. The subject-matter of claim 31 with the addition of means for holding the valve to its seat and taking up the wear of the surfaces.

35. The combination with a tank having an opening therethrough, of a ring secured about the opening outside the tank, a flanged valve case located mainly inside the tank and the flange thereof secured to the ring, a separate bottom cover with an opening located below the flange of the case, and a separate outlet pipe secured to the bottom cover.

36. The combination with a tank having an opening therethrough, of a ring secured about the opening outside the tank, a flanged valve casing carrying a valve located mainly inside the tank with the flange engaging the said ring, and a perforated bottom cover carrying a discharge pipe; the said casing and cover being secured to the said ring by removable bolts whereby the casing can be removed for repairs and the valve seat reground.

37. The subject-matter of claim 36 with the addition of means in connection with the top end of the valve for operating the same.

38. The combination with a metallic tank having an opening therethrough, of a ring riveted about the said opening and the exterior surface of the ring being in a plane, a flanged valve casing carrying a valve the flange of the casing being perforated and matching the plane surface of the ring, a cover with a perforated flange below the casing, removable bolts securing the casing and cover flanges to the said ring, and a discharge pipe detachably secured to the cover.

39. The combination with a tank car having an opening at the bottom, of a ring riveted about said opening, valve mechanism in connection with said ring, means for holding the valve of said mechanism to its seat, a flanged cover with an opening detachably secured to said ring and overlapping the valve mechanism, and means connected to the top of said valve and extending to the top of the car for operating the valve.

40. The combination with a tank having an opening at the bottom, of a rim or ring riveted about said opening and to the metal of the tank; a separate valve casing carrying a seat for a valve located within the rim or ring and detachably secured thereto; an independent cover having an opening therethrough detachably secured to the rim or ring and overlapping the valve casing outside the tank; a valve engaging the seat of the casing; spring means for holding the valve to its seat; operating means at the top of the car; and means loosely connecting said operating means with the valve, whereby the valve will not become displaced by the surging of the liquid contents of the tank or the distortion of the tank body.

41. The combination with a tank car having an opening at the bottom with a rotary discharge valve at said opening and an opening at the top, of means for rotating said valve from a closed to an open position, and vice versa, said means extending from the valve to a position adjacent said top opening, the arrangement of said means being such that the action of opening the valve projects the upper end of said means outside the opening at the top, and the action of closing the said valve lowers the said raised portion of said means below the opening.

42. The combination with a tank car having an opening at the bottom with a discharge valve having rotary motion only at said opening and an opening at the top, of an operating rod or bar in operative connection at its lower end with the valve and its top end located adjacent the said opening at the top, and means for rotating said rod or bar and the valve comprising a pivoted lever, the action of turning said lever upwardly opening the valve and projecting the lever outside the said opening and the action of depressing said lever below the said top opening closing the valve.

43. The combination with a tank car having an opening at the bottom and a dome with an opening at the top, of a rotary discharge valve mechanism closing the opening at the bottom, a rotary rod or bar in operative connection with said valve its top end being located adjacent the dome opening at the top of the tank, and means associated with said rod or bar which when said valve is in open discharge position projects through the dome opening at the top of the tank, and at all times when said valve is closed occupies a position below the said dome opening and within the tank.

In testimony whereof I affix my signature.

MYERS A. GARRETT.